United States Patent
Wang et al.

(10) Patent No.: US 7,149,265 B2
(45) Date of Patent: Dec. 12, 2006

(54) TIMING RECOVERY LOOP WITH NON-INTEGER LENGTH

(75) Inventors: Yung Da Wang, West Bloomfield, MI (US); J. William Whikehart, Novi, MI (US); John Elliott Whitecar, Plymouth, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 769 days.

(21) Appl. No.: 10/440,497

(22) Filed: May 16, 2003

(65) Prior Publication Data

US 2004/0228427 A1    Nov. 18, 2004

(51) Int. Cl.
*H04L 7/00* (2006.01)

(52) U.S. Cl. ..................................................... 375/354
(58) Field of Classification Search ........ 375/354–355, 375/360–361, 374; 327/141, 149, 151, 153, 327/160–161
See application file for complete search history.

(56) References Cited

U.S. PATENT DOCUMENTS

| | | | |
|---|---|---|---|
| 4,010,323 A | 3/1977 | Peck | |
| 4,435,687 A | 3/1984 | Nadan et al. | |
| 5,022,056 A | 6/1991 | Henderson et al. | |
| 5,131,014 A | 7/1992 | White | |
| 5,418,573 A | 5/1995 | Basile et al. | |
| 5,742,532 A * | 4/1998 | Van Duyne et al. | 708/313 |
| 5,781,461 A * | 7/1998 | Jaffe et al. | 708/301 |
| 6,249,750 B1 | 6/2001 | Green et al. | |
| 6,339,553 B1 * | 1/2002 | Kuge | 365/194 |
| 6,463,110 B1 | 10/2002 | Rinderknecht et al. | |
| 6,661,859 B1 * | 12/2003 | Wu | 375/354 |
| 2002/0187751 A1 | 12/2002 | Gierl et al. | |
| 2003/0031283 A1 | 2/2003 | Bronfer et al. | |

FOREIGN PATENT DOCUMENTS

| | | |
|---|---|---|
| DE | 197 40 255 | 3/1999 |
| DE | 2394870 | 5/2004 |
| EP | 0652660 | 10/1995 |
| EP | 0 741 473 | 6/1996 |
| WO | WO 96/31032 | 10/1996 |

* cited by examiner

*Primary Examiner*—Khanh Tran
(74) *Attorney, Agent, or Firm*—Brinks Hofer Gilson & Lione

(57) ABSTRACT

A timing signal is regenerated from an encoded digital signal having a data clock frequency $R_b$ in a receiver using a predetermined sample rate $F_s$, wherein the data clock period $1/R_b$ is not an integer multiple of the predetermined sample period $1/F_s$. The method comprises generating an input pulse signal in response to the encoded digital signal. Each of the input pulse signals is accumulated in a predetermined delay element which stores an accumulated value, wherein the predetermined delay element is in a delay loop including N delay elements each having a respective accumulated value. The accumulated values are circulated within the delay loop by shifting at each of the sample periods according to a predetermined shift sequence, the predetermined shift sequence including a plurality of single shifts and at least one other shift size to provide a number of shifts N+δ during a cycle of N sample periods. A synchronization pulse is generated in response to the accumulated values and a predetermined threshold. A counter is operated to output the timing signal in response to the predetermined sample rate $F_s$, the counter having a variable counter period according to a predetermined counter sequence. The variable counter period has an average over time corresponding to the data clock period $1/R_b$. The counter is reset in response to the synchronization pulse (if synchronization becomes necessary).

11 Claims, 2 Drawing Sheets

TIMING RECOVERY LOOP WITH NON-INTEGER LENGTH

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to recovering a timing signal for a digital data transmission, and, more specifically, to recovering a timing signal without requiring a data receiver to adopt a sampling frequency (and thus a processor clock frequency) that is an integer multiple of the data clock frequency.

When generating digital information in the form of binary signals, each binary bit is assigned to a respective time slot. The time slots are typically of equal duration as determined by a timing signal having a frequency corresponding to the desired bit rate of the binary signal. To assist in the transmission of the digital signal (e.g., in wireless radio communication), a modulation scheme may be used to represent a binary one or zero value. When such a signal is received, the detection or demodulation of the original binary signal depends on timing information being available to identify the correct time slots. It is usually not practical to transmit the original timing signal with the binary data signal. Consequently, it is usually desirable to recover the timing from the transmitted data signal itself.

The Radio Data System (RDS) in Europe and the Radio Broadcast Data System (RBDS) in North America are examples of systems employing wireless broadcasting of digital data. In these systems, a digital data stream supplementing an analog radio (e.g., FM) broadcast is broadcast on a subcarrier using binary modulated signals. By properly demodulating the encoded data, the digital data stream is able to provide the receiver with various enhanced features, such as textual display of program or format type identification, displaying broadcaster name identification, displaying song information (e.g., song title and artist), and providing alternate frequencies for automatic retuning of a radio receiver to another transmitter in a common network when the signal from the current transmitter becomes weak, for example.

The RDS/RBDS data is added to a multiplexed FM broadcast signal using double-sideband, suppressed carrier modulation at a frequency of 57 kHz. The digital data is bi-phase encoded at a data rate of 1,187.5 bits per second. Each binary bit (i.e., either a one or a zero) is represented by a symbol wherein the transitional direction of the time varying signal at the midpoint of a bit time slot signifies the bit value. In order to decode the proper bit values, a proper timing signal must be recovered so that the relative phase of each bit symbol can be distinguished.

In prior art RDS/RBDS receivers, the sampling frequency at which the bi-phase encoded data is sampled has been chosen as an integer multiple of the data clock frequency $R_b$ so that an even amount of integer samples occur during a time slot of the digital data. As a result, it becomes straightforward to generate a timing signal matching the frequency of the bit rate (e.g., by counting at the sample rate to create an alternating timing signal). The regenerated timing signal must also have its phase aligned with the original bit-timing signal. The phase alignment can be accomplished by referencing to the data itself.

Requiring the sampling frequency to be an integer multiple of the data clock frequency may be an undesirable constraint on the design of a particular receiver (as well as a constraint on the choice of sampling frequency and thus the processor clock frequency). In addition, prior art timing recovery implementations have been customized to each particular receiver and have not been portable to other receiver designs. With each new model of a receiver, a new, unique timing recovery apparatus must be designed in accordance with other details of the receiver design (e.g., sampling frequency and data bit rate). The effort to create a custom design results in increased cost and development time.

SUMMARY OF THE INVENTION

The present invention has the advantage of allowing any arbitrary selection of sampling frequency versus data clock frequency while maintaining a recovered timing signal of sufficient accuracy to reliably decode the digital data. Furthermore, the present invention provides a timing recovery method and apparatus that easily adapts to different sampling frequencies and data clock frequencies, thereby providing a re-usable digital signal processing (DSP) building block and reducing development time and cost of receivers using the invention.

In one aspect of the invention, a method is provided for regenerating a timing signal from an encoded digital signal having a data clock frequency Rb in a receiver using a predetermined sample rate $F_s$, wherein the data clock period $1/R_b$ is not an integer multiple of the predetermined sample period $1/F_s$. The method comprises generating an input pulse signal in response to the encoded digital signal. Each of the input pulse signals is accumulated in a predetermined delay element which stores an accumulated value, wherein the predetermined delay element is in a delay loop including N delay elements each having a respective accumulated value. The accumulated values are circulated within the delay loop by shifting at each of the sample periods according to a predetermined shift sequence, the predetermined shift sequence including a plurality of single shifts and at least one other shift size to provide a number of shifts N+δ during a cycle of N sample periods. A synchronization pulse is generated in response to the accumulated values and a predetermined threshold. A counter is operated to output the timing signal in response to the predetermined sample rate $F_s$, the counter having a variable counter period according to a predetermined counter sequence. The variable counter period has an average over time corresponding to the data clock period $1/R_b$. The counter is reset in response to the synchronization pulse (if synchronization becomes necessary).

DETAILED DESCRIPTION OF PREFERRED EMBODIMENTS

Figure 1:
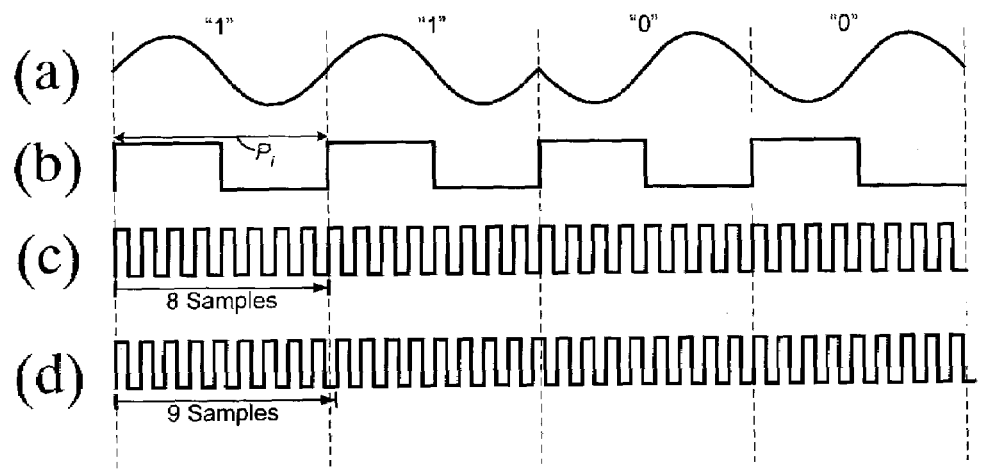
FIGS. 1(a) through (d) illustrate waveforms of various signals for explaining operation of the present invention.

FIG. 1(a) shows an RDS data stream as generated prior to transmission using bi-phase encoding wherein a "1" bit is represented as a single cycle with a first phase (e.g., a negative-going transition at the midpoint of the bit period) and a "0" bit is represented as a single cycle with a second phase which is reversed from the first phase (e.g., a positive-going transition at the midpoint). When consecutive bits have the same value, then a zero-crossing or edge occurs at the beginning, midpoint, and ending of a bit period. When the binary signal changes from one bit value to the other, there is no zero-crossing or edge at the beginning of the corresponding bit period.

FIG. 1(b) shows an ideal clock timing signal corresponding to the timing used to generate the bi-phase encoded data stream and having an ideal bit time slot or bit period $P_i$. It is desired to regenerate a timing signal based on a received data signal like FIG. 11(a) which is a close approximation to the ideal timing signal of FIG. 1(b).

FIG. 11(c) shows a prior art sampling frequency that is selected to be an integer multiple of the ideal bit rate or bit frequency so that a whole number of sampling frequency timing pulses are produced for each cycle of the ideal bit timing signal. For example, a sampling frequency that is 8 times the bit rate is shown (i.e., 8 sample pulses occur for each bit period). Provided that the timing references used to generate the original binary signal and the sampling frequency are each sufficiently accurate to specification, a free running counter driven at the sampling frequency can substantially match the frequency of the original timing signal. It is known in the art to synchronize the phase of the recovered timing signal by several different methods, including pattern matching (e.g., finding sample windows with equal numbers of positive and negative data sample values) and zero crossing detection (e.g., finding the sample position within the clock cycle that contains the most zero crossings).

In the present invention, it is desired to eliminate the prior art requirement that the sampling frequency used in the receiver be an integer multiple of the processor clock frequency. For example, a data clock frequency Rb of an RDS or RDBS signal is 1,187.5 Hz. Prior art receivers have typically used a sampling frequency of 9.5 kHz, so that 8 samples were counted out per RDS bit. Since the sampling frequency must be an integer multiple of the processor clock frequency, only certain frequencies could be used for the processor clock frequency. Because of other considerations in the design of a receiver, it may be desirable to use a sampling frequency (or a base clock frequency) other than a multiple of 1,187.5 Hz. In one possible receiver design, a sampling frequency $F_s$ of 10.546874 kHz could be used which results in a ratio of $F_s$ to $R_b$ of 8.8815789. As shown in FIG. 1(d), there are 8.8815789 sample pulses during one ideal bit period. Since a clock counter can only count integer numbers, however, it is not possible to count an exact period of the data signal. If the clock signal is approximated by counting 9 sample periods, the error between the actual timing and the approximated timing quickly grows to a point where data cannot be reliably detected.

As described in co-pending U.S. application Ser. No. 10/284,231, filed Oct. 30, 2002, now became U.S. Pat. 7,072,431, entitled "Clock Timing Recovery Using Arbitrary Sampling Frequency" and incorporated herein by reference in its entirety, a variable clock period can be created by modulating the clock count S between different integer numbers so that the average clock period (over a plurality of clock periods) is substantially equal to the data clock frequency $R_b$ and the instantaneous error between the clock period and the ideal clock signal is kept small. For example, the number of samples counted out during each variable clock period switches between a value of 9 samples and a value of 8 samples according to a predetermined counter sequence. The variable clock period has an average length that is substantially equal to the data bit period (i.e., the average value of S approaches the ratio $F_s/R_b$). The resulting error between the recovered timing signal and the ideal clock signal is always less than one sample period. Provided that the recovered timing signal is properly phased (i.e., synchronized), it can satisfactorily be used to decode the digital data signal.

Figure 2:
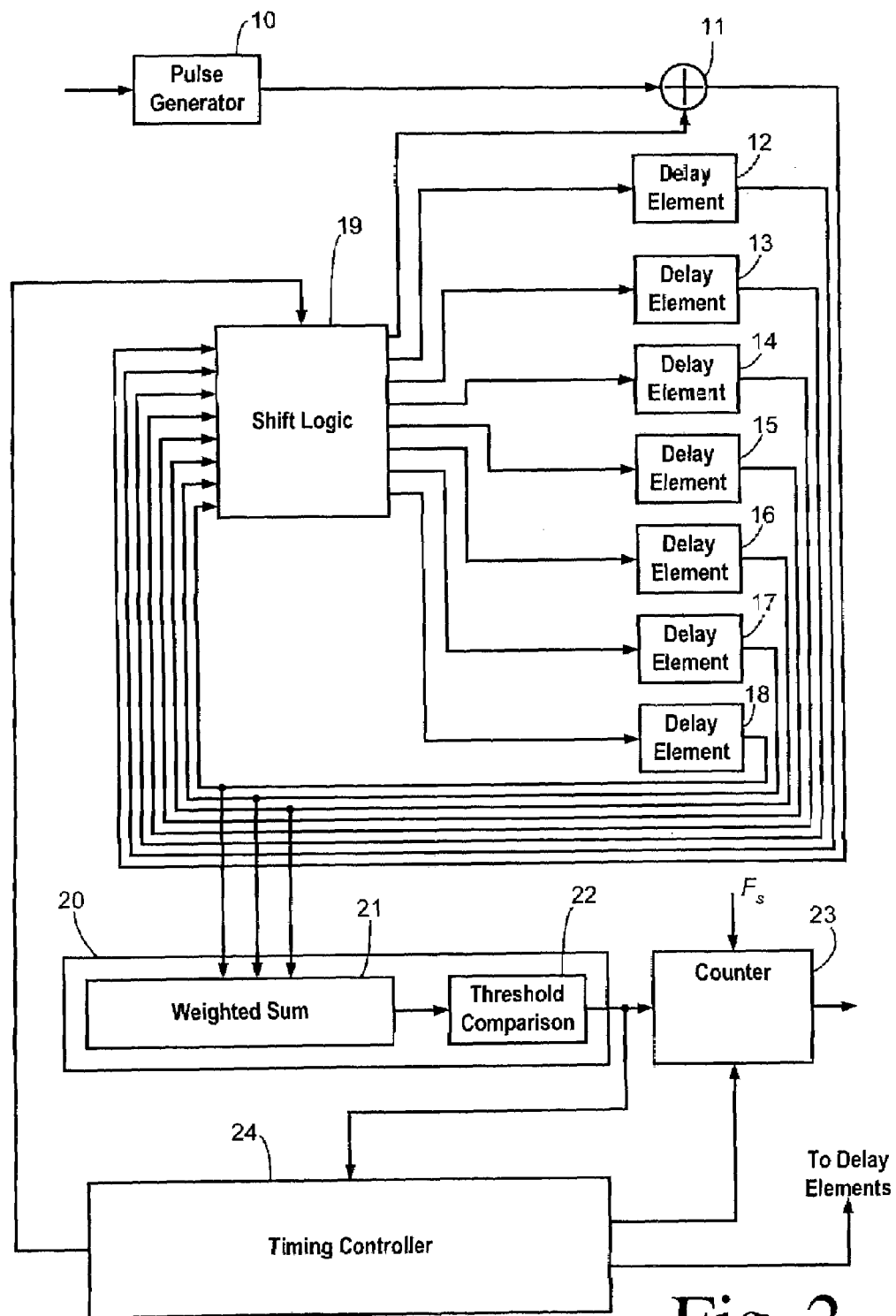
FIG. 2 is a block diagram of a preferred embodiment of a timing recovery apparatus of the present invention.

The present invention synchronizes the recovered clock signal with high accuracy while requiring a minimal amount of processing resources. FIG. 2 shows a timing recovery loop for generating synchronization pulses using a modified/modulated loop length for adding input pulses to delayed input pulses. A pulse generator 10 receives the input data signal and generates input pulses triggered by the input data signal. In a preferred embodiment, the input pulses are one sample period long and have a binary value to indicate each transition (e.g., zero crossing) of the input data signal. The input pulses are provided to one input of a summer 11. The output of summer 11 is coupled to one input of a shift logic circuit 19. A plurality of delay elements 12–18 have their inputs connected to respective outputs of shift logic circuit 19 and have their outputs connected to respective inputs of shift logic circuit 19. One output of the shift logic circuit is coupled to the other input of summer 11. The summer, shift logic circuit, and delay elements operate on digital multi-bit values. These values are circulated between the delay elements in order to provide a delay loop by shifting the values from one delay element to another. This includes the shifting of an accumulated value formed by adding each new input pulse from pulse generator 10 to the value in one of the delay elements. Preferably, the value to be incremented in summer 11 is always from the same delay element (e.g., delay element 12). The values are usually shifted by one element in the delay loop (e.g., from element 12 to element 13, element 13 to element 14, etc.), but can also be shifted by different amounts along the chain as described below.

Shift logic circuit 19 may be comprised of a multiplexer matrix that is selectably configured to interconnect each delay element output with a respective delay element input to achieve single shifts, double shifts, or other shifts. A timing controller 24 is connected to each delay element for providing a shift clocking signal and is connected to shift logic circuit 19 to control the amount of shifting during each sample period.

By matching the length of the delay loop to the nominal period of the ideal clock signal, an input pulse circulating through the loop is reinforced by subsequent input pulses. A pulse timing estimator 20 includes a weighted sum block 21 coupled to the outputs of a consecutive subset of the delay elements (e.g., elements 12, 13, and 14) wherein a weighted sum is formed which is more heavily weighted toward the center delay element of the three (i.e., element 13). The weighted sum is compared to a threshold in a threshold comparison block 22. When the weighted sum reaches or exceeds the threshold, then a synchronization signal is coupled to a reset input of a counter 23 which is clocked at the sample rate $F_s$ to generate the regenerated clock timing signal. Thus, counter 23 is re-synchronized in phase with the incoming data signal. The contents of the delay elements are cleared in response to the synchronization signal so that a new timing estimate can be started. Timing controller 24 is coupled to counter 23 for providing the predetermined counter sequence. Controller 24 is further coupled to shift logic circuit 19 in order to control shifting of the values between delay elements.

Prior art receivers have used a sample rate $F_s$ that was an integer multiple of the data clock frequency or data bit rate $R_b$. A delay loop length was used that corresponded to the integer multiple so that the correct accumulated value was present at the loop entry point when subsequent input pulses occurred. When drift or jitter is present in an incoming data signal, the input pulses become misaligned (i.e., smeared between adjacent pulses). Using a weighted sum allows the best estimate of the proper pulse location to be identified. If large jitter or noise is present, then a synchronization pulse might not be generated for a long time.

Since the timing-recovery counter provides a period equal to data clock period $1/R_b$, it likewise includes an integer number of sample periods in the prior art system. Between synchronization pulses, the counter repeatedly counts out the integer number of sample periods, acting as a "flywheel."

For optimal operation of the timing recovery loop, the total amount of delay in the loop must be as close as possible to the expected time between input pulses. For the prior art, the delay of the loop is equal to the sample period ($1/F_s$) multiplied by the number of delay elements. If a sample period is chosen which is not an integer divisor of the expected time between input pulses, however, it may not be possible to match the loop delay to the input pulse timing with sufficient accuracy. In the present invention, a shift sequence is utilized which varies from a one-to-one correspondence between sample periods and shifts, whereby an effective loop length other than N is obtained (where N is the number of delay elements in the delay loop).

In a preferred embodiment, controller 24 selects between shifting one delay element for most sample periods and a different shift size (e.g., zero or two delay elements) for other sample periods in such a way that the average loop length (i.e., over a plurality of loop cycles) is substantially equal to the ideal clock period ($1/R_b$). Thus, the total number of shifts during N sample periods is equal to N+δ, where δ is the difference between each different shift size in the cycle and a shift of one. For a double shift, δ=1 (i.e., two shifts minus one shift), and for a zero shift, δ=−1. If two double shifts are used in a cycle, then δ equals 2.

The delay loop may be comprised of hardware registers as shown in FIG. 2 for actually shifting accumulated values, or may be a memory buffer and a pointer for cyclically pointing to different positions in the buffer. As an alternative to the shift logic circuit, the hardware registers could be connected in series and then a double shift can be obtained by adding an extra shifting signal during a sample period or by using input multiplexers that can select either the previous register or the register two before it in the loop. A double shift when using a memory buffer can be obtained by advancing the buffer pointer by two addresses. A zero shift can be obtained by disabling either the register shifting or the buffer pointer advancement for one sample period.

If a single shift is used for N−1 sample periods and then a double shift is used for the Nth sample period, the total number of shifts during a cycle of N sample periods is equal to N+1. The average shift per sample period is (N+1)/N delay elements. For an accumulated value circulating in the loop, it moves around the loop slightly faster (on average) with the double shift inserted, thereby shortening the effective loop length. By modulating the number of shifts used between successive cycles, an average loop length comprising a fractional number of sample periods can be obtained.

For example, if the ratio of the data period to sample period were 12.5, then a matching average loop length could be obtained using 13 actual delay elements and by toggling the effective loop length between 12 and 13 sample periods for alternate cycles (i.e., using one double shift during one cycle for a loop length of 12 and then all single shifts on the next cycle for a loop length of 13). In another alternative, 12 actual delay elements could be used along with a zero shift (i.e., lack of shifting) on alternate cycles to create an effective loop length of 13 (and an overall average of 12.5). Preferably, the position of the double shift (or zero shift) within the cycle is dithered (e.g., randomly chosen upon each individual cycle) to minimize instantaneous error.

A predetermined shift sequence preferably includes multiple cycles (i.e., complete loops) in a frame structure within which the average loop length per cycle is substantially equal to the desired data bit period or ideal clock period. The predetermined shift sequence is then reused for subsequent frames. Let P equal an integer number of sample periods in a frame and let Q equal an integer number of loop cycles in a frame. Then the average loop length within the frame (also referred to as the effective loop length $L_{eff}$) is equal to P/Q. Thus, P and Q are selected to be substantially equal to the ratio of sample rate $F_s$ to data clock frequency $R_b$ and N is selected to be an integer factor of Q.

By way of another example in an RDS radio receiver as mentioned above, digital data is bi-phase encoded at a data rate of 1,187.5 bits per second. A sampling frequency $F_s$ of 10.546874 kHz is used, which results in a ratio of $F_s$ to $R_b$ of 8.8815789. Thus, it would be desired to obtain an average effective loop length of about 8.8815789. This can be achieved using a delay loop of actual length 9 and modulating the effective length of individual cycles between 8 and 9 by using double shifts in predetermined cycles within a frame to create a predetermined shift sequence. For example, all single shifts are used for 7 cycles (effective length of 9), then single shifts and one double shift in one cycle (effective length of 8), then all single shifts for 8 cycles, and then singles shifts and one double shift in a last cycle of the frame. The overall effective length within this frame is 8.8823529 which is close enough to 8.8815789 to maintain proper synchronization.

Within the same frame structure, the predetermined counter sequence is set up so that the counter repeats the same average period over the frame. Another example sequence is as follows. Beginning at the start of the frame, a period or cycle count of S is used for the first V periods, where S is typically equal to N and V is an integer. Then a single period is inserted using a cycle count of S−1. Then the next W periods use the cycle count S, followed by another single period using S−1. Further periods using cycle counts S or S−1 are inserted in the frame to make the average counter period within the frame equal to the loop period (and equal to or very nearly equal to the data clock period). Let G be the number of times that V is used, H be the number of times that W is used, and J be the number of S−1 periods in the frame. The total number of cycles Q in the frame is G+H+J. The total number of sample periods P in the frame is (G×V×S)+(H×W×S)+(J×(S−1)). Thus, the average counter period is [(G×V×S)+(H×W×S)+(J×(S−1))]/(G+H+J) sample periods.

The counter periods using a cycle count of S−1 are preferably started at the same time as the cycles of the delay loop using a double shift. By generating these simultaneously, processing time is saved in the microcontroller.

Figure 3:
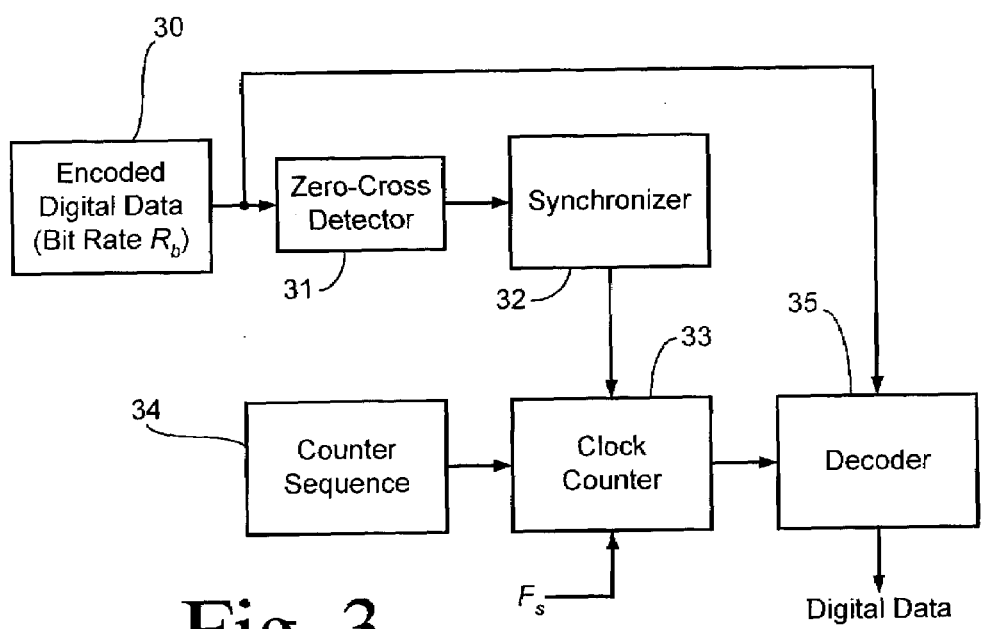
FIG. 3 is a block diagram showing one preferred hardware implementation of the invention in greater detail.

One preferred apparatus for implementing the present invention using digital signal processing (DSP) components is shown in FIG. 3. A receiver front end 30 provides an encoded digital data signal having a bit rate Rb. Front end 30 may comprise a radio tuner and demodulator for receiving an RDS broadcast, for example. The encoded digital data signal is provided to a zero-crossing detector 31 and to a decoder 35. Input pulses from zero-crossing detector 31 are provided to a synchronizer 32. Based on a predetermined shift sequence and a threshold embodied in synchronizer 32, a synchronization or sync signal is provided to a clock counter 33.

A programmable memory 34 contains the predetermined counter sequence used by clock counter 33 to generate a recovered timing frequency based on a sampling frequency $F_s$. Using sampling frequency $F_s$ as a counting reference, clock counter 33 regenerates the timing signal which is provided to decoder 35 to regenerate the original binary data stream.

What is claimed is:

1. A method of regenerating a timing signal from an encoded digital signal having a data clock frequency $R_b$ in a receiver using a predetermined sample rate $F_s$, wherein a data clock period $1/R_b$ is not an integer multiple of a predetermined sample period $1/F_s$, said method comprising the steps of:
   generating input pulse signals in response to said encoded digital signal;
   accumulating each of said input pulse signals in a predetermined delay element to store an accumulated value in said predetermined delay element, said predetermined delay element being in a delay loop including N delay elements, each delay element storing a respective accumulated value;
   circulating said accumulated values within said delay loop by shifting at each of said sample periods according to a predetermined shift sequence, said predetermined shift sequence including a plurality of single shifts and at least one other shift size to provide a number of shifts N+δ during a cycle of N sample periods, where δ is the difference between each different shift size in the cycle and a shift of one;
   generating a synchronization pulse in response to said accumulated values and a predetermined threshold;
   operating a counter to output said timing signal in response to said predetermined sample rate $F_s$, said counter having a variable counter period according to a predetermined counter sequence, said variable counter period having an average over time corresponding to said data clock period $1/R_b$; and
   resetting said counter in response to said synchronization pulse.

2. The method of claim 1 wherein a position of said at least one other shift size within a respective cycle is dithered with respect to other adjacent cycles.

3. The method of claim 1 wherein said one other shift size is comprised of a double shift.

4. The method of claim 1 wherein said one other shift size is comprised of a zero shift.

5. The method of claim 1 wherein said predetermined sequence comprises a frame including a plurality of said cycles such that respective values of N+δ for respective cycles are not the same for all of said cycles, said synchronization pulses being generated with an average period substantially equal to an integer multiple of said processor clock period $1/R_b$.

6. The method of claim 5 wherein said predetermined counter sequence is synchronized with said frame.

7. The method of claim 1 wherein said predetermined counter sequence switches between first and second counter periods.

8. Apparatus for regenerating a timing signal from an encoded digital signal having a data clock frequency $R_b$ in a receiver using a predetermined sample rate $F_s$, wherein a data clock period $1/R_b$ is not an integer multiple of a predetermined sample period $1/F_s$, said apparatus comprising:
   an input pulse generator coupled to said encoded digital signal and generating an input pulse signal triggered by said encoded digital signal;
   a delay loop comprising N delay elements each for storing a plurality of respective accumulated values for circulating within said delay elements;
   an input summer for incrementing a respective accumulated value in a predetermined delay element in response to said input pulse signal;
   a timing pulse estimator for generating a synchronization pulse in response to said accumulated values and a predetermined threshold;
   a counter for outputting said timing signal in response to said predetermined sample rate $F_s$, said counter having a variable counter period according to a predetermined counter sequence, said variable counter period having an average over time corresponding to said data clock period $1/R_b$, said counter being reset by said synchronization pulse; and
   a controller for shifting said accumulated values within said delay loop to circulate each of said sample periods according to a predetermined shift sequence, said predetermined shift sequence including a plurality of single shifts and at least one other shift size to provide a number of shifts N+δ during a cycle of N sample periods, where δ is the difference between each different shift size in the cycle and a shift of one.

9. The apparatus of claim 8 wherein said N delay elements are comprised of hardware registers.

10. The apparatus of claim 8 wherein said N delay elements are comprised of a buffer and a buffer pointer.

11. The apparatus of claim 8 wherein said receiver is comprised of a wireless broadcast radio receiver.

* * * * *